United States Patent
Battle et al.

(10) Patent No.: US 11,301,254 B2
(45) Date of Patent: Apr. 12, 2022

(54) INSTRUCTION STREAMING USING STATE MIGRATION

(71) Applicant: International Business Machines Corporation, Armonk, NY (US)

(72) Inventors: Steven J. Battle, Austin, TX (US); Joshua W. Bowman, Austin, TX (US); Hung Q. Le, Austin, TX (US); Dung Q. Nguyen, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/521,833

(22) Filed: Jul. 25, 2019

(65) Prior Publication Data
US 2021/0026642 A1   Jan. 28, 2021

(51) Int. Cl.
*G06F 9/38* (2018.01)
*G06F 9/48* (2006.01)

(52) U.S. Cl.
CPC .......... *G06F 9/3851* (2013.01); *G06F 9/3844* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 6,112,019 A | 8/2000 | Chamdani et al. | |
| 6,311,261 B1 | 10/2001 | Chamdani et al. | |
| 6,389,446 B1 * | 5/2002 | Torii | G06F 8/45 718/100 |
| 6,760,835 B1 * | 7/2004 | Yu | G06F 9/3804 712/205 |
| 7,711,934 B2 * | 5/2010 | Kishore | G06F 9/384 712/233 |
| 7,873,776 B2 * | 1/2011 | Hetherington | G06F 9/3824 711/5 |

(Continued)

OTHER PUBLICATIONS

Anonymous, "Speculative Restore of History Buffer in a Microprocessor", IP.com Prior Art Database Technical Disclosure, IPCOM000250357D, Jul. 5, 2017, 6 pages.

(Continued)

*Primary Examiner* — Michael Sun
(74) *Attorney, Agent, or Firm* — Scully, Scott, Murphy & Presser, P.C.

(57) ABSTRACT

A method, system, and/or processor for processing data is disclosed that includes processing a parent stream, detecting a branch instruction in the parent stream, activating an additional child stream, copying the content of a parent mapper copy of the parent stream to an additional child mapper copy, dispatching instructions for the parent stream and the additional child stream, and executing the parent stream and the additional child stream on different execution slices. In an aspect, a first parent mapper copy is associated and used in connection with executing the parent stream and a second different child mapper copy is associated and used in connection with executing the additional child stream. The method in an aspect includes processing one or more streams and/or one or more threads of execution on one or more execution slices.

20 Claims, 11 Drawing Sheets

(56) References Cited

U.S. PATENT DOCUMENTS

| | | | | |
|---|---|---|---|---|
| 8,417,923 B2* | 4/2013 | Williams | ............ | G06F 9/30054 712/227 |
| 2011/0283095 A1* | 11/2011 | Hall | ...................... | G06F 9/3009 712/228 |
| 2013/0191825 A1* | 7/2013 | Muff | ................... | G06F 9/30189 718/1 |
| 2015/0006862 A1* | 1/2015 | Gschwind | ........... | G06F 9/30145 712/226 |
| 2019/0347125 A1* | 11/2019 | Sankaran | .............. | G06F 9/3863 |
| 2020/0042319 A1* | 2/2020 | Lloyd | ................... | G06F 9/3836 |
| 2020/0133679 A1* | 4/2020 | Brandt | .................... | G06F 9/522 |

OTHER PUBLICATIONS

Perais, "Increasing the performance of superscalar processors through value prediction", HAL archives-ouvertes.fr, https://tel.archives-ouvertes.fr/tel-01235370v2, submitted Mar. 3, 2016, 171 pages.

Anonymous, "Apparatus for Interleaving Execution of Distinct Conditional Vector-Branches Using Multidimensional Field Condition Registers", IP.com Prior Art Database Technical Disclosure, IPCOM000214688D, Feb. 2, 2012, 3 pages.

Anonymous, "Dependency Chain Prioritization to Speed Up Branch With Low-Confidence Prediction", IP.com Prior Art Database Technical Disclosure, IPCOM000247282D, Aug. 18, 2016, 5 pages.

* cited by examiner

| Mode | SS0, Mapper Copy 0 | SS0, Mapper Copy 1 | SS1, Mapper Copy 0 | SS1, Mapper Copy 1 |
|---|---|---|---|---|
| ST | Thread 0 | | Thread 0 | |
| SMT2 | Thread 0 | Thread 2 | Thread 0 | Thread 2 |
| SMT4 | Thread 0 | Thread 2 | Thread 1 | Thread 3 |

FIG. 17

INSTRUCTION STREAMING USING STATE MIGRATION

BACKGROUND OF INVENTION

The present invention generally relates to data processing systems, processors, and more specifically to out-of-order execution processors and simultaneous multi-threading processors.

Processors currently used in data processing systems process more than one instruction at a time, and often process those instructions out-of-order. In modern computer architecture, there are several known ways to design a computer adapted to perform more than one instruction at a time, or at least in the same time frame. For example, such a computer may include more than one processor core (i.e., central processing unit) and each processor core may be capable of acting independently of other processor cores. This may allow for true multitasking, with each processor core processing a different instruction stream in parallel with the other processor cores of the computer.

Another design to improve throughput includes multiple execution slices within a processor core to process multiple instruction threads at the same time, with the threads sharing certain resources of the processor core. An execution slice may be a pipeline or pipeline-like structure where multiple data processing hardware units are connected in series to process multiple instructions in a single processing cycle. Pipelining involves processing instructions in stages, so that the pipelined stages may process a number of instructions concurrently. Multiple execution slices may be used as part of simultaneous multi-threading within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destination(s) for results of the operation. In a "dispatch" stage, the decoded instruction is dispatched to an issue queue (ISQ) where instructions wait for data and an available execution unit. Next, an instruction in the issue queue is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

SUMMARY

The summary of the disclosure is given to aid an understanding of a computer system, computer architectural structure, processor, register files, and method of using register files in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

In one or more embodiments, a method of processing data in a processor is disclosed. The method in an embodiment includes processing a parent stream, detecting a branch instruction in the parent stream, activating an additional child stream, copying the content of a parent mapper copy of the parent stream to an additional child mapper copy, dispatching instructions for the parent stream and the additional child stream, and executing the parent stream and the additional child stream on different execution slices. In an aspect, a first parent mapper copy is associated and used in connection with executing the parent stream and a second different child mapper copy is associated and used in connection with executing the additional child stream. The method in an embodiment includes determining the number of threads of execution that the processor is executing, and in an aspect processing one or more threads of execution on one or more execution slices. The method can further include deactivating one of the parent or child streams, and further include deactivating the mapper copy for the deactivated stream.

In one or more embodiments, a system for processing data is disclosed where the system preferably has at least one processor having at least one super slice; the at least one super slice having at least two execution slices for processing instructions, and a mapper having two mapper file copies, each mapper file copy having entries for storing data; each execution slice having at least one execution unit; one or more computer readable non-transitory storage media; and programming instructions stored on the one or more computer readable non-transistory storage media for execution by the at least one processor. The programming instructions when executed by the processor preferably cause the processor to process a parent stream; detect a branch instruction in the parent stream; activate an additional child stream; copy the contents of the parent mapper file copy of the parent stream to an additional child mapper file copy; dispatch instructions for the parent stream and the additional child stream, and execute the parent stream and additional child stream on different execution slices using different execution units.

In one or more further embodiments, a system for processing data is disclosed where the system has at least one processor having at least one super slice; the at least one super slice having at least two execution slices for processing instructions, each execution slice having at least one execution unit; at least one physical register file per super slice; at least one mapper per super slice for tracking associations between the physical register file and logical register files, each mapper having at least two mapper file copies, each mapper file copy having a plurality of entries for storing data, at least one mapper file copy associated with each execution slice, where the system is configured to execute multiple threads of execution and multiple streams of one or more threads of execution. In one or more embodiments, the processor comprises two super slices, each super slice having two execution slices, the processor configured to process a single thread of execution, two threads of execution simultaneously, or four threads of execution simultaneously, and the processor is further configured to process up to four streams of execution, wherein the processor is configured to activate one of the mapper file copies to process an additional stream and to copy the contents of a parent mapper file copy to an additional child mapper file copy to process the additional stream using the additional child mapper file copy.

BRIEF DESCRIPTION OF THE DRAWINGS

The various aspects, features, and embodiments of the computer system, computer architectural structure, processors, register files, and/or their method of operation will be better understood when read in conjunction with the figures provided. Embodiments are provided in the figures for the purpose of illustrating aspects, features, and/or various embodiments of the computer system, computer architectural structure, processors, register files, and their method of operation, but the claims should not be limited to the precise system, assembly, subassembly, arrangement, structures, features, aspects, embodiments, and/or devices shown, and the systems, assemblies, subassemblies, arrangements, structures, features, aspects, embodiments, methods, processes, and/or devices shown may be used singularly or in combination with other systems, assemblies, subassemblies, arrangements, structures, features, aspects, embodiments, methods and/or devices.

FIG. 17 illustrates mapper thread assignments according to an embodiment.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, register files, and their method of operation, however, it will be understood by those skilled in the art that different and numerous embodiments of the computer system, computer architectural structure, processor, register files, and their method of operation may be practiced without those specific details, and the claims and invention should not be limited to the system, assemblies, subassemblies, embodiments, features, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of registers. It may be noted that a numbered element is numbered according to the figure in which the element is introduced, and is typically referred to by that number throughout succeeding figures.

Figure 1:
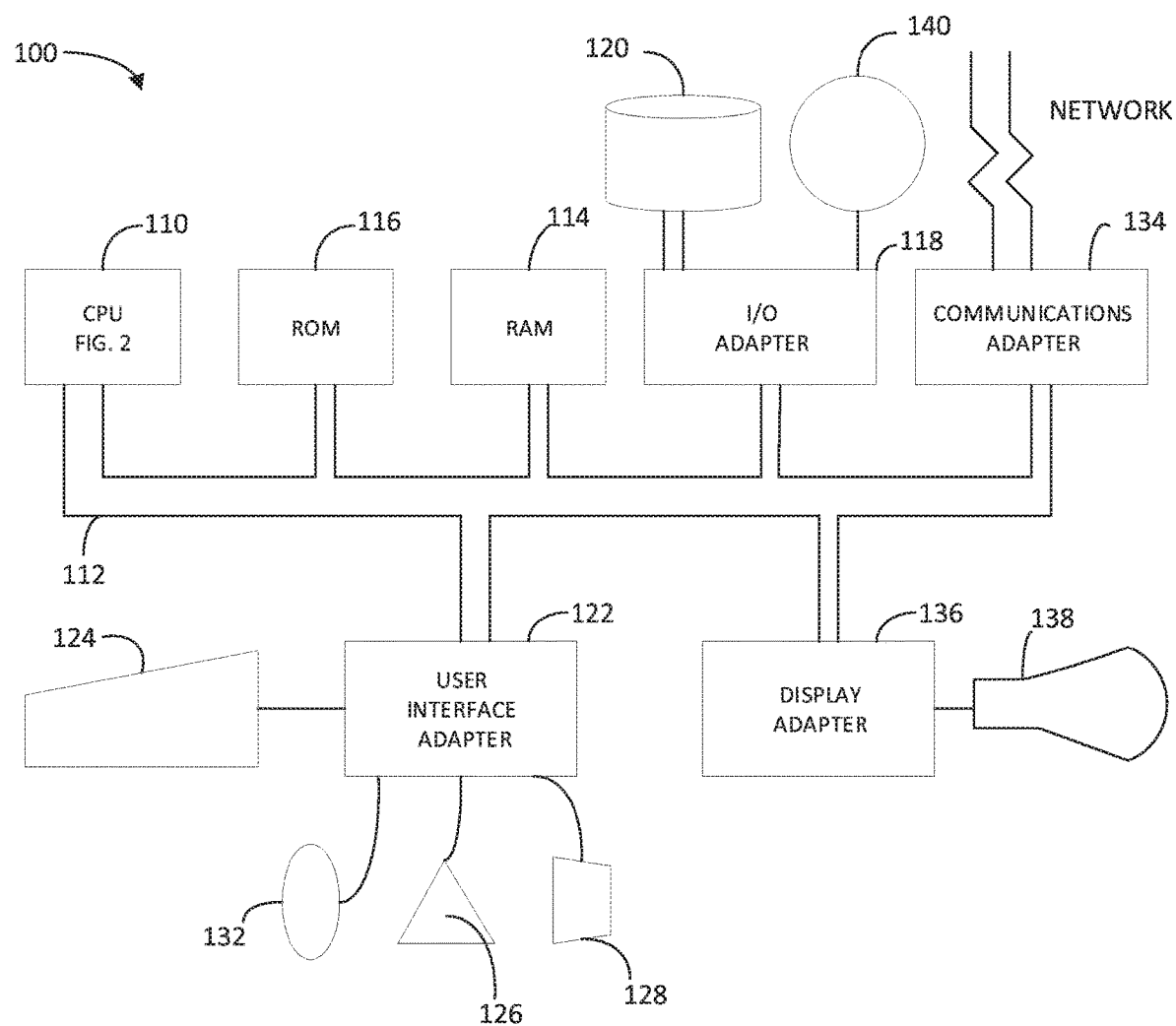
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
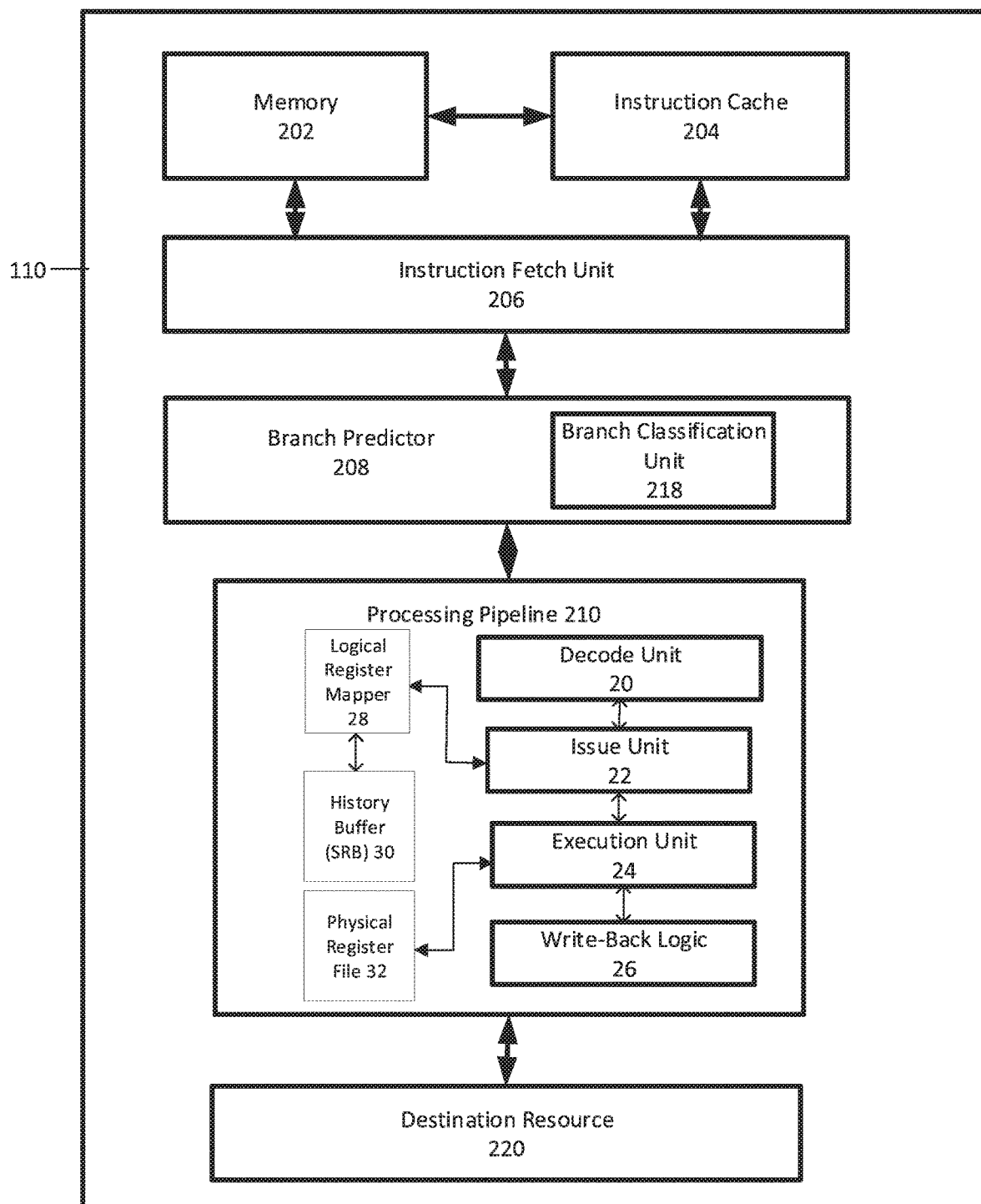
FIG. 2 illustrates a block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units, vector scaler execution units, and/or other execution units. The logical register mapper 28 contains entries that provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer 30 stores information from the logical register mapper 28 when a new instruction evicts data in case the new instruction is flushed and the old data needs to be recovered. The history buffer (SRB) 30 keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. In one or more embodiments, the destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
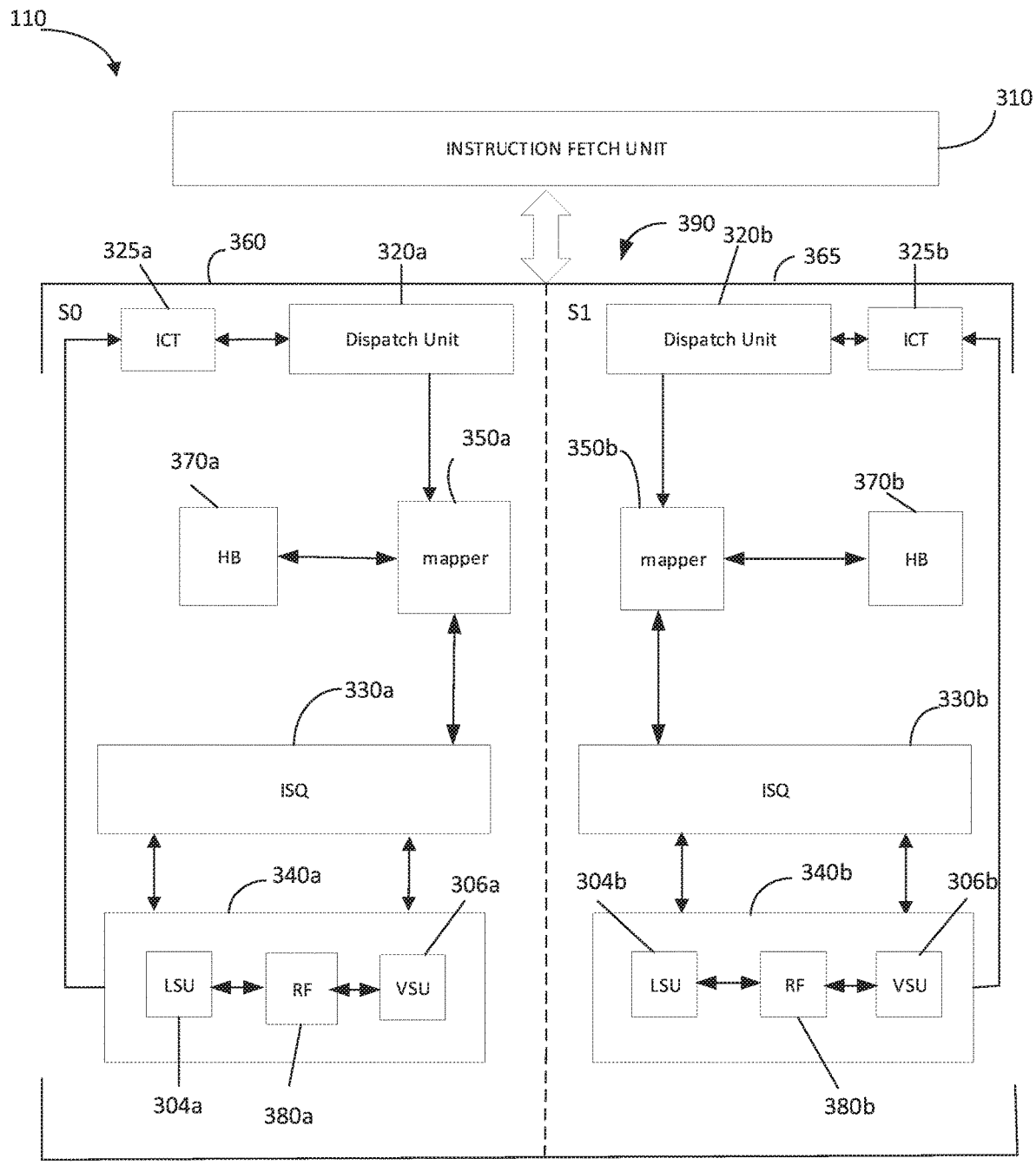
FIG. 3 illustrates a block diagram of a portion of a multi-slice processor in accordance with certain aspects of the present disclosure.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other configurations. As shown in FIG. 3, the multi-slice processor includes two processing slices-Slice 0 (slice S0 or 360) and Slice 1 (slice S1 or 365). The processor includes an Instruction Fetch unit 310. Each of the slices S0 and S1 includes an Instruction Dispatch Unit (320a and 320b); an Issue Queue (ISQ) (330a and 330b); Instruction Completion Table (ICT) (325a and 325b); Execution Units (340a and 340b) that include a load store unit (LSU) (304a and 304b), a vector scalar unit (VSU) (306a and 306b), and a Register File (RF) (380a and 380b); a History Buffer (HB) (370a and 370b); and a Logical Register Mapper (350a and 350b). The Execution Unit 340 may include one or more queues to hold instructions for execution by the Execution Unit 340.

It may be noted that the two slices are shown for ease of illustration and discussion only, and that multi-slice processor 110 may include more than two processing or execution slices with each slice having all the components discussed above for each of the slices S0 and S1 (slices 360 and 365). Further, the processing slices may be grouped into super slices (SS 390), with each super slice including a pair of processing slices. For example, a multi-slice processor may include two super slices SS0 and SS1, with SS0 including slices S0 and S1, and SS1 (not shown) including slices S2 and S3.

The Instruction Fetch Unit 310 fetches instructions to be executed by the processor 110 or processor slice. Instructions that are fetched by the Instruction Fetch Unit 310 are sent to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380.

In certain aspects, the ISQ 330 holds a set of instructions and the register file 380 accumulates data for the instruction inputs. A register file may be used for staging data between memory and other functional (execution) units in the processor. There may be numerous register files and types. When all source data accumulates for the instruction, the data is passed on to one or more execution units designated for execution of the instruction. Each of the LSUs 304 and VSUs 306 may make result data available on the write back buses for writing into a register file (RF) entry.

When data is not ready, e.g., not within the appropriate data cache or register, delay can result as the ISQ 330 will not issue the instruction to the Execution Unit 340. For at least this reason, the Issue Queue (ISQ) typically issues instructions to the Execution Units 340 out of order so instructions where the required data is available can be executed. Dispatch Unit 320 in one or more embodiments will stamp each instruction dispatched to the Issue Queue 330 with an identifier, e.g., identification tag (itag), to identify the instruction. The Dispatch Unit 320 may stamp instructions with other information and meta data. The instructions (itags) typically are allocated (assigned) and stamped in ascending program order on a per thread basis by the Dispatch Unit 320. Dispatch Unit 320 may also maintain a per thread instruction counter that increments for each instruction in a thread that is dispatched to the Issue Queue 330.

Logical register mapper 350 contains meta data (e.g., itag, RFtag, etc.) which provides a mapping between entries in the logical register (e.g., GPR1) and entries in physical register file 380 (e.g., physical register array entry). The RFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., the physical register array entry.

The Execution Unit 340 executes instructions out-of-order and when the Execution Unit 340 finishes an instruction, the Execution Unit 340 will send the finished instruction, e.g., itag, to the ICT 325. The ICT 325 contains a queue of the instructions dispatched by the Dispatch Unit 320 and tracks the progress of the instructions as they are processed. In an embodiment, the ICT 325 has a completion tail pointer that keeps track of the progress of executing instructions in the thread, e.g., points to the next to complete instruction. In an embodiment, the instruction entry in the ICT will not identify the instruction as complete until all older instructions in the thread are completed.

History buffer (SRB) 370 contains logical register entries the logical register mapper 350 evicts from the logical register mapper 350 by younger instructions. The information stored in the history buffer (SRB) 370 may include the itag of the instruction that evicted the logical register entry (i.e., the evictor itag) from the logical register. History buffer (SRB) 370, in an embodiment, stores itag, logical register entry number (the bit field that identifies the logical register entry (LReg)), and Register File tag (RFTag) information. The RFTag is a pointer that correlates an entry in a logical register to an entry in the Physical Register File 380. History buffer (SRB) 370 may store and track other information. History buffer (SRB) 370 has an interface to the logical register mapper 350 to recover the itag, and register file tag (RFTag) (and other meta data) for each evicted logical register entry (LReg). The information is kept in the history buffer (SRB) 370 in a history buffer (SRB) entry until the new instruction (evictor instruction) is completed. At which point there is no reason to keep the old entry in the history buffer, e.g., SRB 370, and the entry is removed from the history buffer, as there is no flush recovery that could cause the history buffer (SRB) entry to be recovered.

A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple slices may considerably increase processing speed of the multi-slice processor. In single-thread (ST) mode a single thread is processed, and in SMT mode, two threads (SMT2) or four threads (SMT4) are simultaneously processed.

In an aspect, each execution/processing slice may have its own register file as shown in FIG. 3. In another aspect, one register file may be allocated per super slice and shared by the processing slices of the super slice. In one aspect, one register file may be allocated to more than one super slice and shared by the processing slices of the super slices. For example, slices S0, S1, S2, and S3 may be allocated to share one register file. In an embodiment, the register file 380 may be partitioned or sliced into portions, blocks or banks, where each execution unit writes to a specific portion, block or bank of the register file 380. This is referred to as a slice-target register file (STF). In an embodiment, each execution slice may have two or more blocks or banks of register files, and may have one or more copies of the blocks or banks of register files from the other execution slices. In an embodiment, at dispatch time, a mapper will assign a block of the register file, preferably a STF block of the register file, to each execution unit. The RF entries in register file 380 may be indexed by a tag identifier assigned by the mapper. For a slice-target register file (STF), the mapper in an embodiment assigns a STF tag and the blocks of the STF register file are indexed by the STF tag.

Disclosed is a processor, architectural system, and method for parallel execution of both paths of a branch instruction, including a low confidence branch. In one or more embodiments, the logical register mapper will maintain mapper states for multiple streams by utilizing logical register mapper copies that are used to support multi-thread processing. That is, in an embodiment, the processor will execute instructions down both paths of a branch, executing multiple streams of instructions in the same thread.

In one or more embodiments, the logical register mapper contains multiple copies of the register state to support multi-threading (SMT). At the start of a stream, one or more of the unused mapper copies are initialized for use in streaming, e.g., parallel execution of branch instructions. The state of the logical register mapper is copied from the mapper of the parent stream to the mapper of the child stream to permit parallel execution of multiple streams of instructions from the same thread. This copying and use of mapper copies permits streaming to be supported using existing hardware used to support multi-threading. At the end of a stream, the stream state is deallocated and the mapper can be used by another stream, or as part of multi-threading capabilities. In an aspect, to use the full processor bandwidth, the stream state for the stream of the correct path is copied at the end of a stream to the multiple mapper copies to allow all the resources of the processor to be utilized. That is, in an embodiment, the state of the mapper copies will be copied at the start and conclusion of a stream.

At a branch instruction it is desirable to continue execution down both paths to resolve the branch, and increase processor efficiency and performance as well as decrease processor latency. In an embodiment, at the branch instruction, two streams are created, e.g., a parent stream and a child stream, preferably with separate stream identifications. The processor, system, and method will fetch instructions, dispatch and execute instructions down both paths, preferably using different processing pipelines or execution slices to execute multiple paths in parallel, until the branch is resolved. At resolution of the branch, the branch that is the wrong path is terminated, and the processor, system, and method continue executing down the correct path. In one or more embodiments, the mapper state of the correct branch may be copied to other mappers in different execution slices.

Figure 4:
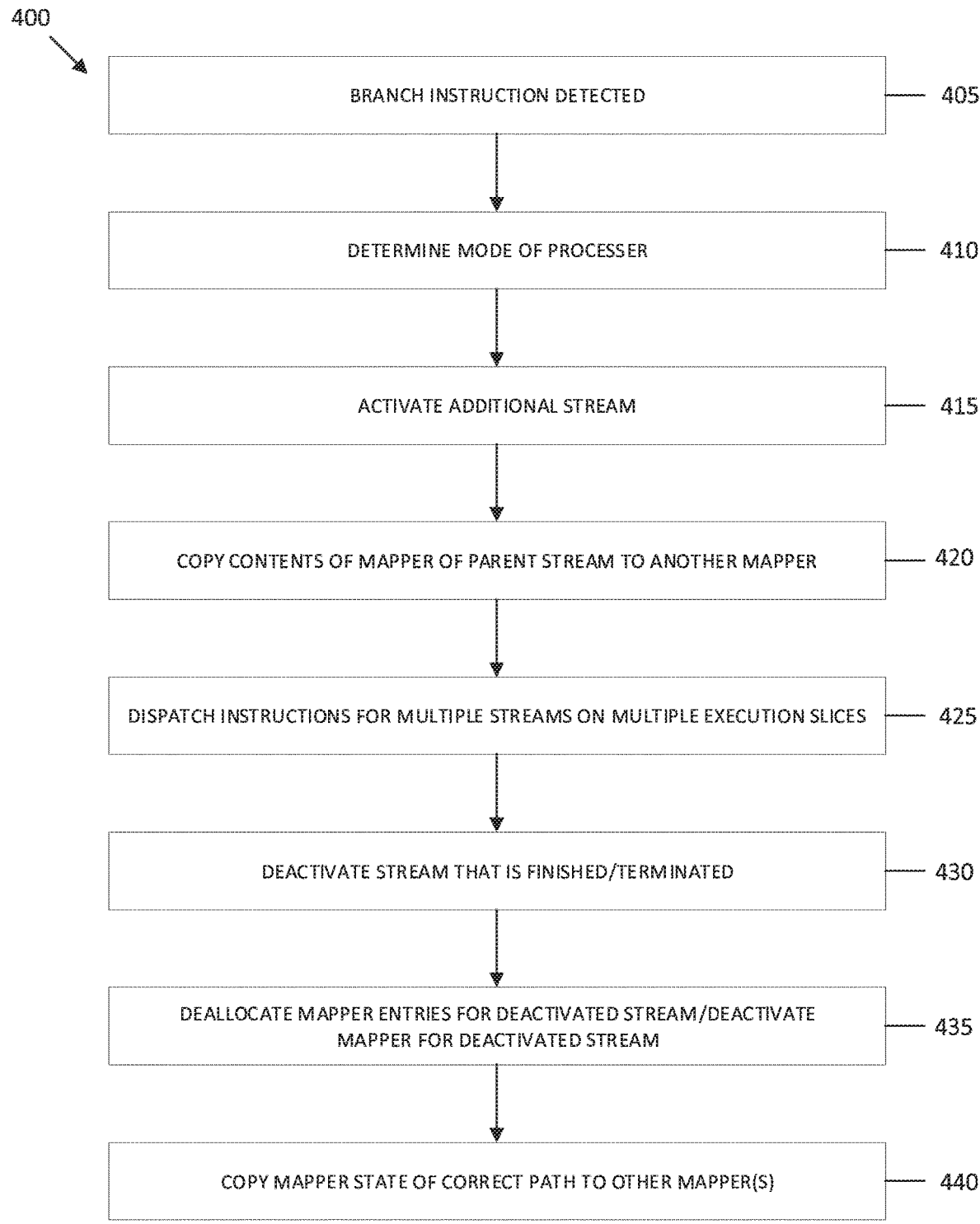
FIG. 4 illustrates a flow diagram of a method according to an embodiment for processing data in a processor including a method of handling multiple streams of instructions in a thread in a processor.

FIG. 4 is an exemplary flowchart in accordance with one embodiment illustrating and describing a method of handling instructions in an information handling system, and more specifically a method of parallel processing of branch instructions or multiple streams, in accordance with an embodiment of the present disclosure. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, simultaneously, or the steps may be performed in the order disclosed or in an alternate order.

The method 400 of processing instructions in a processor and preferably handling parallel execution of multiple streams of instructions is described in connection with the flow chart of FIG. 4. At 405 a branch instruction is detected, preferably in a multi-threaded processor that has multiple execution or processing slices. In an embodiment, the processor can be configured to parallel process one or more branches of the branch instruction simultaneously, and in one or more aspects is configured to process multiple branches of a low-confidence branches. At 410, in one or more embodiments the mode of the processor is detected to determine whether the processor has available resources or execution slices available to parallel process multiple branches, e.g., process multiple streams. In this regard, for a processor that handles four (4) threads per processor core, and can process in single-thread (ST) mode, two-thread mode (SMT2), or four-thread mode (SMT4), the processor in an aspect should be operating in single thread or two-threaded mode to process more than one stream at a time.

If the processor has the resources, at 415 an additional stream is activated. The contents of the mapper (parent mapper) handling the thread that has the branch, e.g., the parent stream, are copied at 420 to an additional mapper, e.g., a copy of the mapper (child mapper), to handle the instructions of the additional stream. At 425 the instructions for the different streams (parent and child streams) are dispatched and processed on different execution slices. In one or more embodiments, the instructions from one stream (e.g., the parent streams) are executed using the mapper, issue queue, execution units and register file of one execution slice and the instructions from a different stream (e.g., the child steam) are executed using the mapper, issue queue, execution units and register file from a different execution slice. In one or more embodiments, the stream identification can be used to determine which mapper copy to use.

At the conclusion of one of the streams, e.g., because it was the wrong path, at 430 the stream that is concluded or finished is deactivated. In one or more embodiments, the mapper entries of the deactivated stream are deallocated, and or flushed at 435. In one or more embodiments, deallocating the mapper entries can include disabling the mapper. In one or more embodiments, when the branch is resolved, the mapper of the correct path at 440 is copied at the end of the stream to one or more of the multiple mappers or mapper copies.

Figure 5:
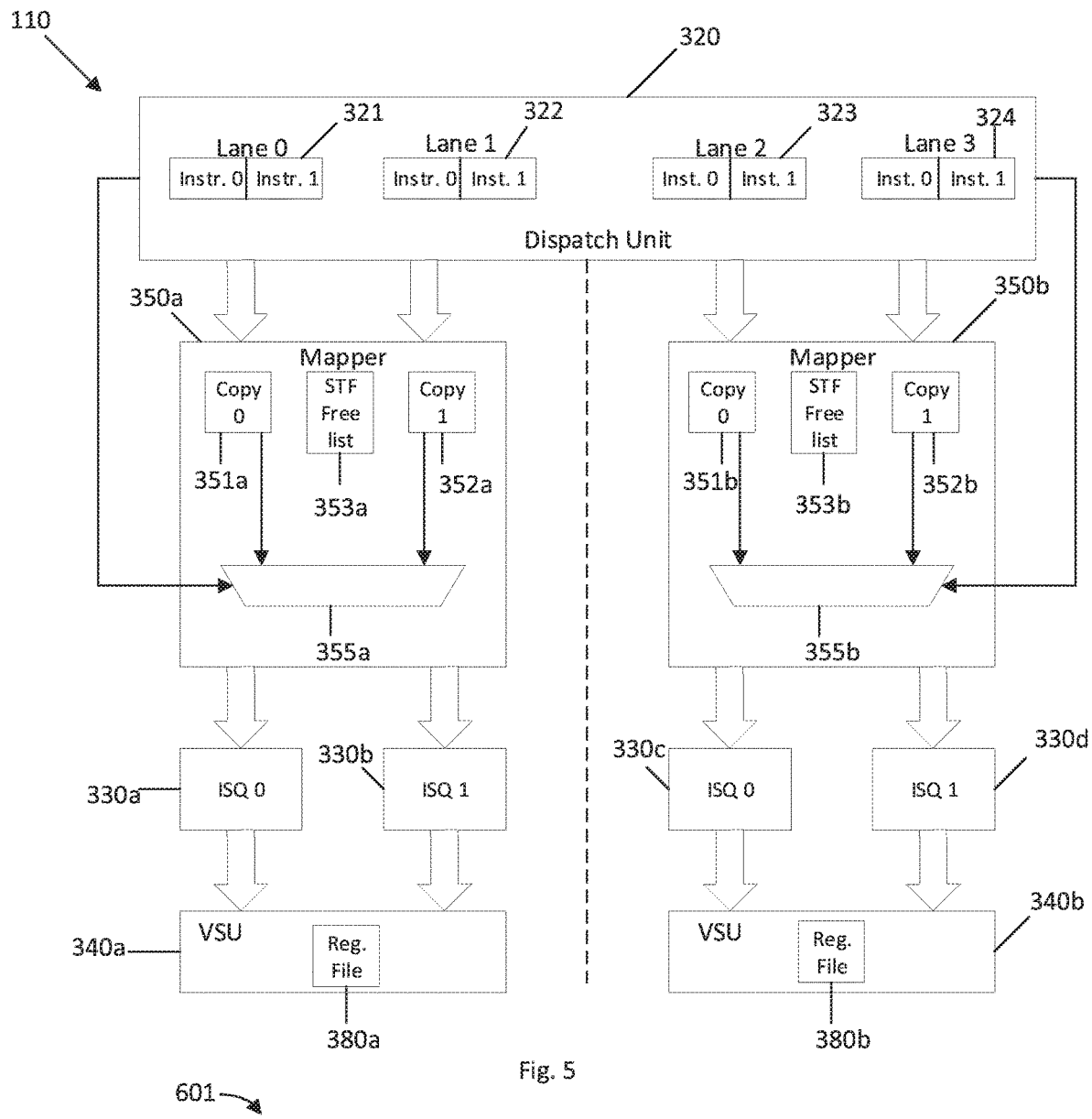
FIG. 5 illustrates a block diagram of a portion of a multi-slice processor configured for simultaneous multi-threading operation and for parallel processing of branch instructions according to an embodiment of the disclosure.

The method and system of handling multiple streams on a multi-threaded processor will be described in connection with a processor that has four execution slices to handle up to four threads of execution simultaneously as shown in FIG. 5. The illustrative configuration and architecture of the processor is shown in FIG. 5 and includes four execution slices configured as two super slices. The processor 110 includes a dispatch unit 320 that has a plurality of lanes (321, 322, 323, 324) for dispatching instructions. Each super slice of the processor preferably has a mapper (350*a* and 350*b*) that includes two copies 351 and 352 of the logical register mapper (copy 0 and copy 1) and a register file free list 353. The register file free list tracks the register file entries that are deallocated and free to be used. In the embodiment of FIG. 5, the register file 380 is a slice target register file (STF) and the mapper contains an STF free list 353. In an embodiment, the mappers 350 each include a multiplexor (355*a* and 355*b*) to select which mapper copy to use. The processor 110 further includes two issue queues (330*a* and 330*b* for SS0 and 330*c* and 330*d* for SS1) per super slice to track and hold the instructions for the different execution slices. The processor of the illustrative embodiment of FIG. 5 also includes one or more VSU execution units (340a and 340b) per super slice that have one or more physical register files (380a and 380b) per super slice.

Other configurations of the processor are contemplated and the disclosure is not limited to the embodiment of FIG. 5. In an aspect, the processor of FIG. 5 is configured for multi-threading operation as well as multi-streaming operation. This disclosure is directed in one or more embodiment to the use of a multi-threaded processor to handle multi-streaming operations where the processor can execute multiple paths of a branch instruction, preferably a low-confidence branch.

In the processor of FIG. 5, the mapper 350 tracks the youngest version of each logical register entry (LREG) per thread. The mapper 350 reads source LREGs at dispatch, writes destination LREGs, and sends evicted mapper entries to the history buffer (Save and Restore Buffer (SRB)). Entries are restored to the mapper 350 from the history Buffer (SRB) at flush. The mapper 350 manages STF tags as the actual physical register files 380 are located in the VSU as shown in FIG. 5. The mapper 350 uses the free list 353 to track available register entries and to manage the allocation and deallocation of STF tags. In the embodiment of FIG. 5, each super slice has a different STF tag pool.

In one or more embodiments, depending upon which mode the processor is operating in, the mapper 350 has different thread assignments. For example, in an embodiment, when operating in single-thread (ST) mode, the single and only operating thread is assigned to mapper copy 0 in each super slice. In single-thread (ST) mode, in one or more embodiments, each mapper copy 0 in each super slice is a mirror image of the mapper copy 0 in the other slice, and mapper copy 1 in each super slice is disabled. In single-thread (ST) mode, the mapper 350 has three additional mapper copies that are available to use for processing additional streams in the single thread. In two-threaded mode (SMT2), in an embodiment the processor is configured, and can have logic and programming, so that the first thread (T0) is processed in mapper copy 0 in each super slice and the second thread (T2) is processed in mapper copy 1 of each super slice. There are two additional mapper copies that are available to use for processing additional streams in two-threaded (SMT2) mode. In the embodiment of FIG. 5, in an aspect, the processor is configured, and can have logic and programming, so that there are no additional mapper copies available to process additional streams if the processor is operating in four-threaded mode (SMT4). FIG. 17 illustrates the mapper thread assignments according to an embodiment and uses shading to indicate the additional mappers available to use for processing additional streams without using additional processing hardware not already configured as part of the multi-threaded processor configured to process up to four (4) threads simultaneously.

Figure 6:
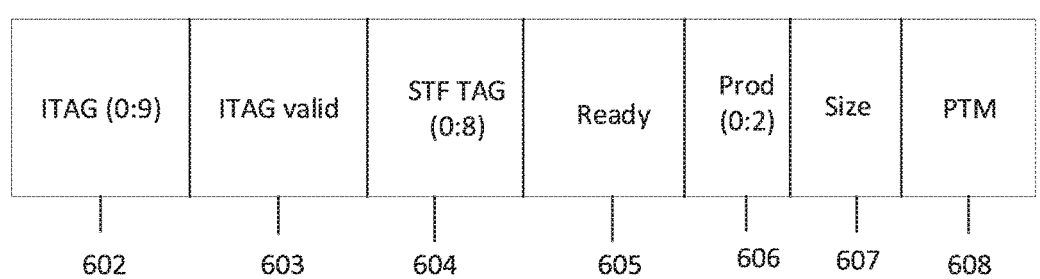
FIG. 6 illustrates a diagram representing the entry fields of a logical register mapper in accordance with an embodiment of the disclosure.

FIG. 6 shows illustrative Mapper entry fields 601 according to one embodiment of a processor that handles multi-threading and multi-streaming operations. The mapper entry fields 601 include an ITAG and ITAG valid field (602 and 603) to identify the instructions and indicate whether the instruction is valid. The mapper entry field 601 also includes a bit field for the register file tag 604 which indicates the register entry, and in an embodiment, the STF Tag for the STF register entry. The entry field also can include a ready bit 605 to indicate data has written back, or an instruction is ready to issue, producer bits 606 which identify the unit the instruction is assigned to write back from, and a size bit 607 to indicate the size of the instruction writing the register (e.g., 64b or 128b). The mapper entry field can include other bits as desired. There may be more or less mapper entry fields than shown in FIG. 6 and the fields may be different than the fields indicated in FIG. 6.

An example of a processor operating in single-thread (ST) mode and encountering a branch instruction and thereafter operating to process both paths of the branch instruction will be discussed in connection with the multi-threaded processor of FIG. 5. In the processor of FIG. 5 operating in single-thread (ST) mode, mapper copy 1 in each super slice is unused and is reserved for use in SMT2/SMT4 mode, while mapper copy 0 in both super slices are mirror images and have the same data and are used as redundancies as the single thread (thread 0) is processed in both super slices and one mapper copy from each super slice is used. When processing two streams in single-thread mode, at the start of a stream, data is copied from mapper copy 0 to mapper copy 1 (e.g., in both super slices) and processing is continued in both streams as if processing two threads in SMT2 mode. In this example, no data movement is undertaken since data is already mirrored across the super slices.

In an embodiment, in a processor operating in single-thread (ST) mode, the processor begins in single-thread mode (ST) with only a single stream active, and copy 1 of the mapper disabled. Instructions are dispatched on stream 0 and populate the mapper and physical registers. When a branch instruction is encountered, the processor, if operating in single-thread mode (ST) or two-thread mode (SMT2), can process both paths of the branch instruction simultaneously, e.g., in parallel. In an embodiment, the instruction fetch unit (IFU) sends a signal activating child stream 1 to be processed separate from parent stream 0. In an embodiment, the IFU sends a signal to the Issue Queue (ISQ) signaling the start of a new stream. In one or more embodiments, the IFU sends the stream ID of the newly created stream and the stream ID of the parent stream to the Issue queue (ISQ).

Figure 7:
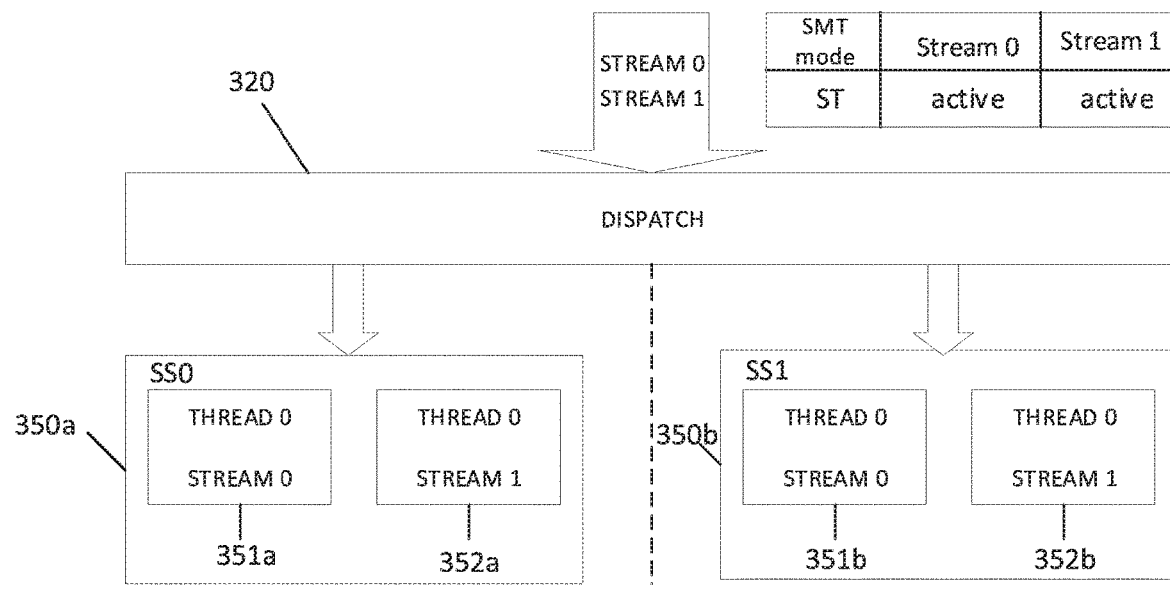
FIG. 7 illustrates a block diagram of a portion of a multi-slice processor operating in single thread mode and parallel processing two streams of the same thread of instructions according to an embodiment of the disclosure.

The mappers, in response to activating a stream separate from the parent stream, copies the contents from mapper copy 0 into mapper copy 1 in both super slices, and preferably in unison in one cycle window. In an embodiment, the contents of mapper copy 0 can be read out and written to mapper copy 1. In an embodiment, the mapper copies the mapper state from the parent stream to the mapper copies to be used for the newly created child stream. In one or more aspects, copying the contents of the mapper for the parent stream to the mapper to be activated for the child stream requires additional muxing to allow a single cycle copy from one mapper to the other mapper. In an embodiment, to facilitate copying of the mapper contents to another mapper, the mapper entries are organized and located close to one another. No data is required to be moved between the super slices since the data in mapper copy 0 was mirrored across the super slices while operating in ST mode (and in SMT2 mode). The processor then dispatches instructions on stream 0 and stream 1 as shown in FIG. 7. The mapper uses the stream identification (ID) to select from which mapper (copy 0 or copy 1) to read the data. Dispatch 320 sends the stream ID (passed from the IFU) with each dispatching instruction to the multiplexor (shown in FIG. 5) in the mapper, which the mapper uses to select which mapper copy (copy 0 or copy 1) to access. In one or more embodiments, the stream ID is an implied field based upon the side of the mapper being utilized.

When one of the paths or streams being processed has finished or concluded, e.g., the stream is terminated if it is the wrong path, the instruction fetch unit (IFU) deactivates the stream that is terminated. In an embodiment, the IFU sends a signal ending a stream along with the stream ID of the stream that is terminated. In response to the stream being deactivated, in an embodiment, the mapper deallocates entries in the mapper copy that corresponds to the stream that is deactivated. In an embodiment, the copy of the mapper corresponding to the stream that is terminated is also disabled. In one or more embodiments, the mapper uses the stream ID of the stream that is terminated to disable the mapper copies no longer in use. Flush of the ending stream in an embodiment handles deallocation of resources, e.g., deallocation of mapper copy entries (STF tags). In an aspect, end of the stream is needed to disable the mapper.

Figure 8:
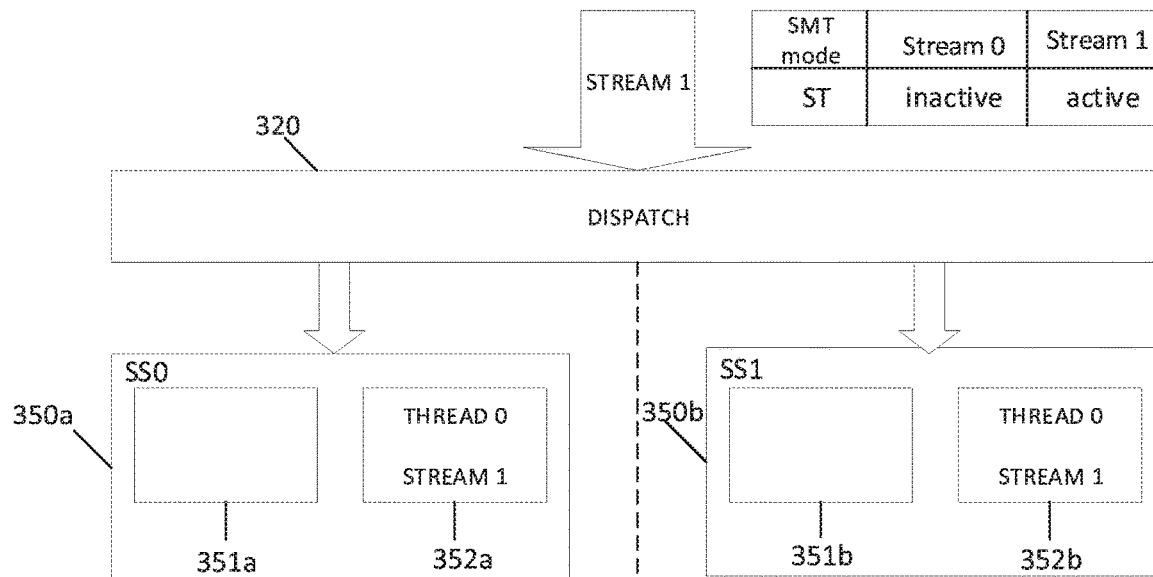
FIG. 8 illustrates a block diagram of a portion of a multi-slice processor operating in single thread mode and processing one stream of a thread of instructions after disabling the processing of one of two streams of the same thread of instructions according to an embodiment of the disclosure.

Dispatch of instructions continues on the stream that was not disabled, and the mapper that corresponds to the stream that was terminated is ready to start another stream. For example, FIG. 8 shows a portion of the processor where stream 0 is deactivated (inactive), the mapper deallocates entries from mapper copy 0 corresponding to stream 0, and disables mapper copy 0. Dispatch continues on stream 1 and mapper copy 0 is ready to start a new stream. Ending a stream has more impact when the stream instructions have progressed and advanced past two streams.

In one or more aspects, a stream may flush internally without ending the stream. When ending a stream, multiple streams may need to be flushed, for example, if the parent is ended. In one or more embodiments, to flush within a stream, at the end of a stream, or to clear multiple streams, a stream mask is used to know which stream ID to flush. The flush mask may include information identifying the flush ITAG, a flush ITAG valid bit, and a bit field to identify the stream to be flushed. For example, where the processor can operate in SMT4 mode (process four threads at a time), and can process four streams at a time, a four bit binary code may be utilized—one bit for each stream. An example of the four bit binary code can be "0bVXYZ", where V represents stream 0, X represents stream 1, Y represents stream 2, and Z represents stream 3. In such an example 0b1010 indicates stream 0 and stream 2 should be flushed.

In single-thread (ST) mode there are two unused mapper copies that allows two streams to be supported easily. Depending upon how the processor is configured and its logic, data can already be mirrored across both super slices so no data movement between super slices is needed at the start or ending of a stream. As the number of streams increases to four (either four streams in ST mode or two streams per thread in SMT2 mode), it is beneficial to maintain data mirroring in order to avoid moving data between super slices. With four streams, unlike in SMT4 mode, the STF tag pool will not be split between super slices (see FIG. 13). When handling four streams in single-thread (ST) mode, the mapper copies are used like in SMT4 mode, and each stream exists in a single mapper copy. In certain configurations, certain streams are only able to dispatch to certain super slices.

Figure 9:
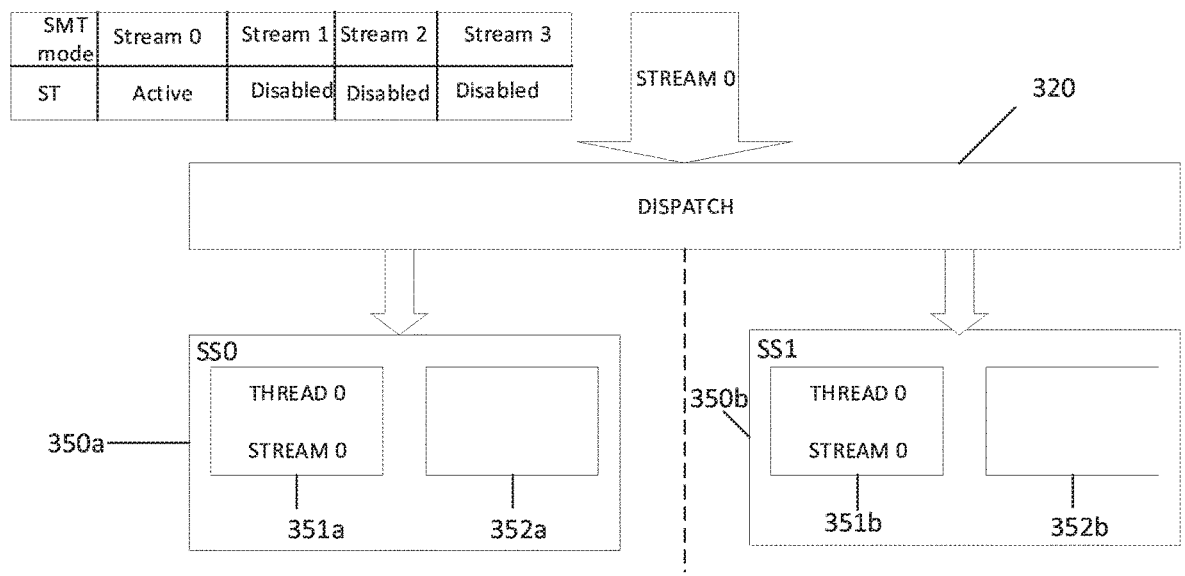
FIG. 9 illustrates a block diagram of a portion of a multi-slice processor operating in single thread mode and processing one stream of a thread of instructions according to an embodiment of the disclosure.

An example of a processor operating in single-thread (ST) mode and encountering multiple branch instructions and thereafter operating to process multiple paths of the branch instructions will be discussed in connection with the multi-threaded processor of FIG. 9. In the processor of FIG. 9, the process starts operating in single-thread (ST) mode where only a single stream is active, mapper copy 1 in each super slice is unused/disabled and is reserved for use in SMT2/SMT4 mode, while mapper copy 0 in both super slices are mirror images and have the same data and are used as redundancies as the single thread (thread 0) is processed in both super slices and one mapper copy from each super slice is used. Instructions are dispatched on stream 0 and populates mapper copy 0 in each super slice and the physical registers.

When a branch instruction is encountered, the processor, if operating in single-thread mode (ST) or two-thread mode (SMT2), can process both paths of the branch instruction simultaneously, e.g., in parallel. In an embodiment, the instruction fetch unit (IFU) sends a signal activating child stream 1 to be processed separate from parent stream 0. In an embodiment, the IFU sends a signal to the Issue Queue (ISQ) signaling the start of a new child stream 1. In one or more embodiments, the IFU sends the stream ID of the newly created stream and the stream ID of the parent stream to the Issue Queue.

Figure 10:
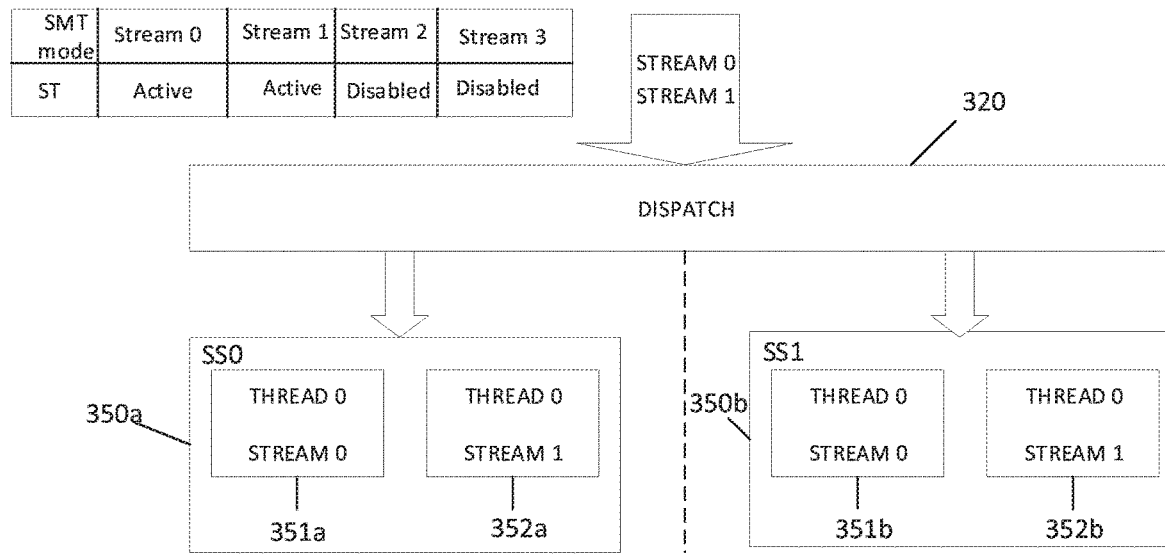
FIG. 10 illustrates a block diagram of a portion of a multi-slice processor operating in single thread mode and parallel processing two streams of the same thread of instructions according to an embodiment of the disclosure.

The mappers, in response to activating a stream separate from the parent stream, copies the contents from mapper copy 0 into mapper copy 1 in both super slices, and preferably in unison in one cycle window. In an embodiment, the contents of mapper copy 0 can be read out and written to mapper copy 1. In an embodiment, the parent mapper copies the mapper state from the parent stream to the child mapper copies to be used for the newly created child stream. In an embodiment, no data is required to be moved between the super slices since the data in mapper copy 0 was mirrored across the super slices while operating in ST mode (and in SMT2 mode). The processor then dispatches instructions on stream 0 and stream 1 as shown in FIG. 10. The mapper uses the stream identification (ID) to select from which mapper (copy 0 or copy 1) to read the data. Dispatch sends the stream ID (passed from the IFU) with each dispatching instruction to the multiplexor (shown in FIG. 5) in the mapper, which the mapper uses to select which mapper copy (copy 0 or copy 1) from each super slice to access.

When an additional branch instruction is encountered, the processor, if operating in single-thread mode (ST), can further process another stream simultaneously, e.g., in parallel. with the two streams already being processed. In an embodiment, the instruction fetch unit (IFU) sends a signal activating child stream 2 to be processed separate from parent stream 0 and child stream 1. In an embodiment, the IFU sends a signal to the Issue Queue (ISQ) signaling the start of a new child stream 2 and activating stream 2 with parent stream 0. In one or more embodiments, the IFU sends the stream ID of the newly created stream 2 and the stream ID of the parent stream 0 to the Issue Queue.

Figure 11:
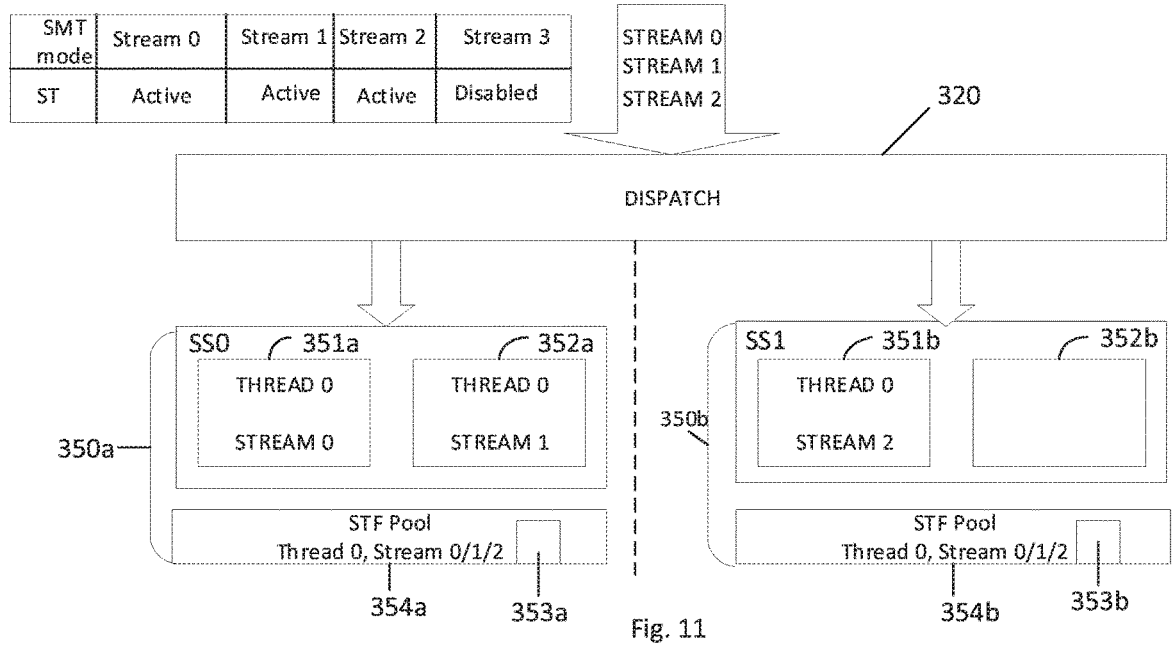
FIG. 11 illustrates a block diagram of a portion of a multi-slice processor operating in single thread mode and parallel processing three streams of the same thread of instructions according to an embodiment of the disclosure.

In response to activating stream 2 with parent stream 0, the mapper repartitions the mapper and mapper copies for processing four (4) streams and disables super slice 1 (SS1) mapper copy 1 as shown in FIG. 11. The contents from mapper copy 0 of super slice 0 (SS0) is already the same as the data contents in mapper copy 0 in super slice 1 (SS1). No data is required to be moved between the super slices since the data in mapper copy 0 was mirrored across the super slices while processing two streams operating in ST mode (and in SMT2 mode). The processor then dispatches instructions on stream 0, stream 1, and stream 2 as shown in FIG. 11. The mapper uses the stream identification (ID) to select from which mapper (SS0 copy 0 or copy 1, or SS1 copy 0) to read the data. Dispatch 320 sends the stream ID (passed from the IFU) with each dispatching instruction to the multiplexor (shown in FIG. 5) in the mapper, which the mapper uses to select which mapper copy (copy 0 or copy 1) from each super slice to access. It should be noted that in an embodiment the STF pool when operating to process multiple streams is shared across all slices and super slices as shown in FIG. 11, unlike in one or more embodiments when operating in SMT4 mode and processing four threads where the tag pool is split between superslices. That is, in an embodiment, when operating in SMT4 mode, the STF pool for superslice 0 (SS0) is for threads 0 and 2 (even threads) and the STF pool for superslice 1 (SS1) is for threads 1 and 3 (odd threads).

When yet another additional branch instruction is encountered, the processor, if operating in single-thread mode (ST), can further process another stream simultaneously or in parallel with the three streams already being processed. In an embodiment, the instruction fetch unit (IFU) sends a signal activating child stream 3 to be processed separate from parent stream 0, child stream 1, and child stream 2. In an embodiment, the IFU sends a signal to the Issue Queue (ISQ) signaling the start of new child stream 3 and activating stream 3 with parent stream 0. In one or more embodiments, the IFU sends the stream ID of the newly created stream 3 and the stream ID of the parent stream 0 to the Issue Queue.

Figure 12:
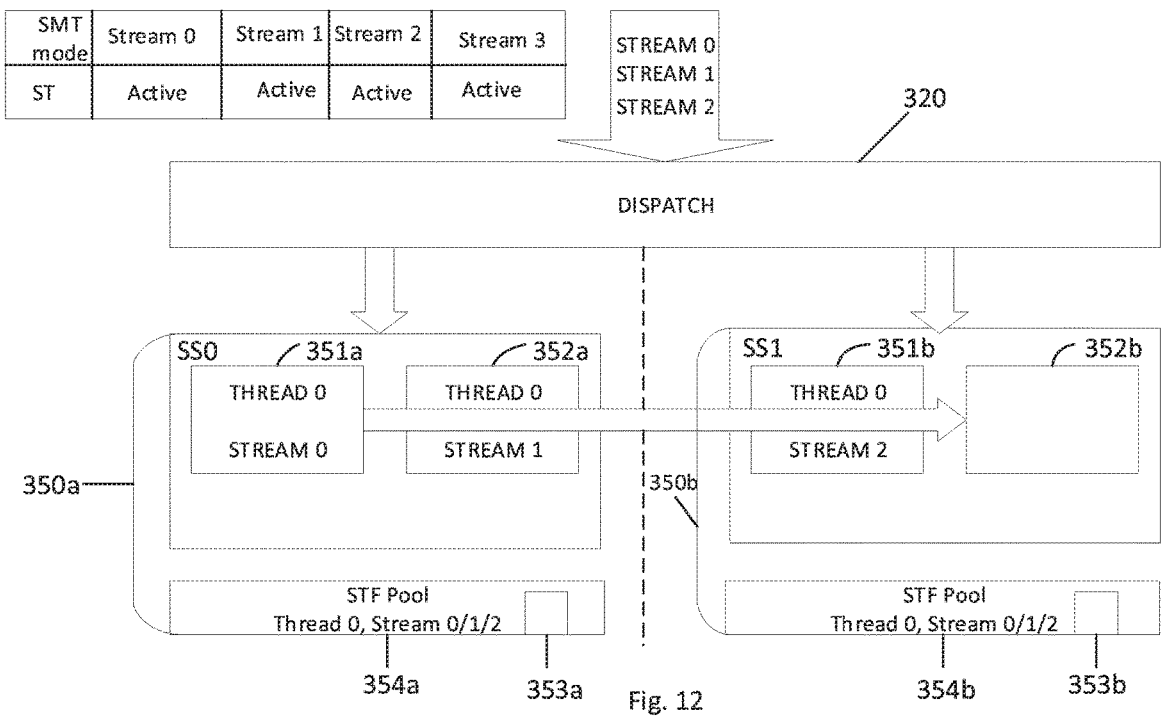
FIG. 12 illustrates a block diagram of a portion of a multi-slice processor operating in single thread mode and parallel processing three streams of the same thread of instructions where the processor is in process of activating a fourth stream of the same thread of instructions according to an embodiment of the disclosure.
Figure 13:
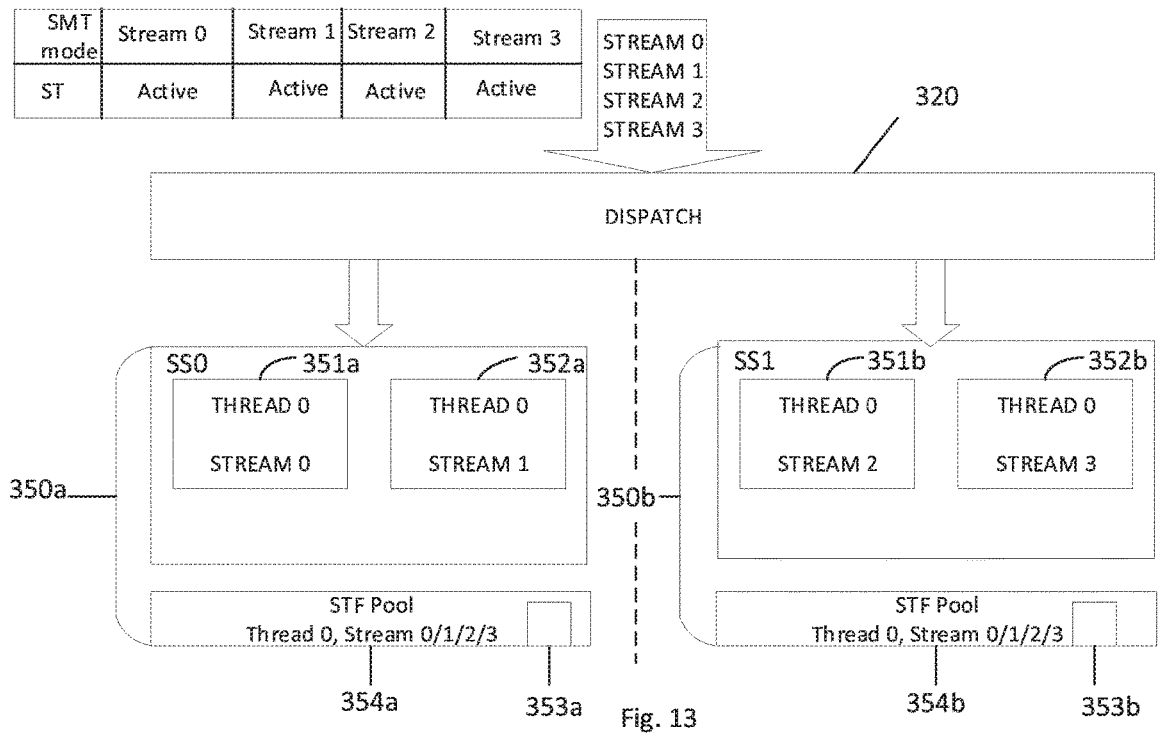
FIG. 13 illustrates a block diagram of a portion of a multi-slice processor operating in single thread mode and parallel processing four streams of the same thread of instructions according to an embodiment of the disclosure.

In response to activating stream 3 with parent stream 0, the mapper copies the mapper data from super slice 0 (SS0) copy 0 to the unused mapper copy, e.g., super slice 1, copy 1, as shown in FIG. 12. In an embodiment, the contents of super slice 0 (SS0) mapper copy 0 can be read out and written to super slice 1 (SS1) mapper copy 1. In an embodiment, the mapper copies the mapper state from the parent stream to the mapper copies to be used for the newly created child stream 3. In an embodiment, the mapper state of super slice 0 (SS0)) copy 0 is copied to super slice 1 (SS1) copy 1 preferably in unison in one cycle window. The processor then dispatches instructions on stream 0, stream 1, stream 2, and stream 3 as shown in FIG. 13. The mapper uses the stream identification (ID) to select from which mapper (SS0 copy 0 or copy 1, or SS1 copy 0 or copy 1) to read the data. Dispatch sends the stream ID (passed from the IFU) with each dispatching instruction to the multiplexor (shown in FIG. 5) in the mapper, which the mapper uses to select which mapper copy (copy 0 or copy 1) from each super slice to access.

Figure 14:
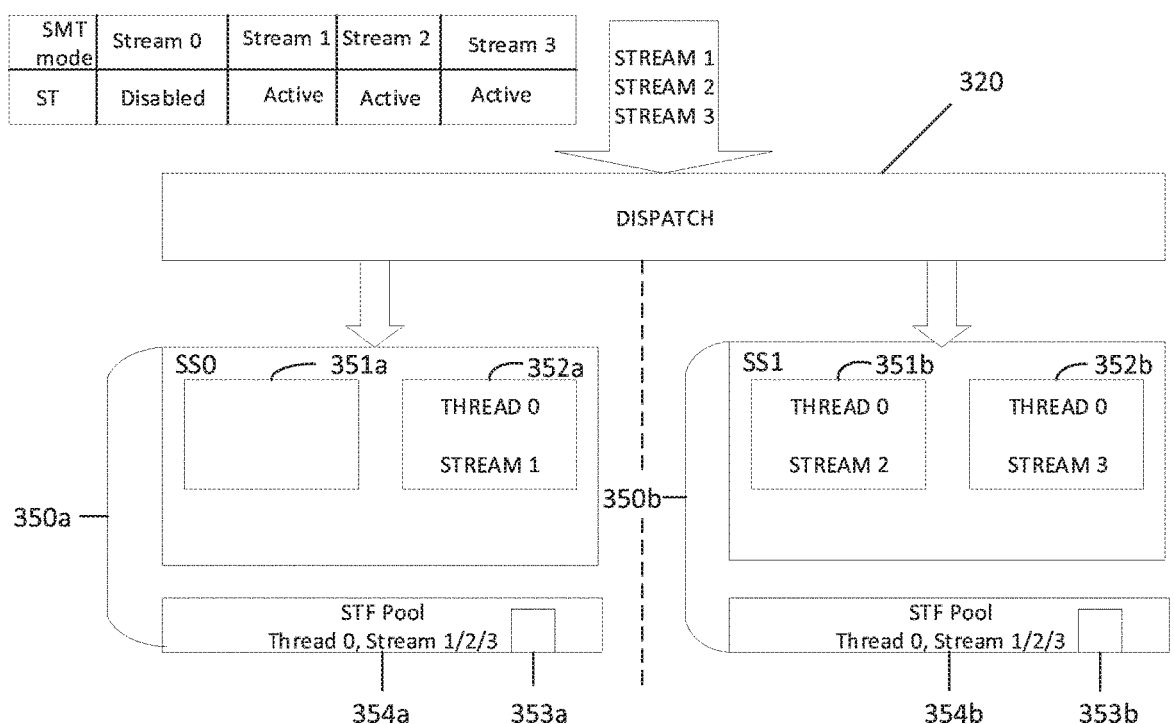
FIG. 14 illustrates a block diagram of a portion of a multi-slice processor operating in single thread mode and parallel processing three streams of the same thread of instructions after disabling the processing of one of four streams of the same thread of instructions according to an embodiment of the disclosure.

When one of the paths or streams being processed has finished or concluded, e.g., the stream is terminated if it is the wrong path, the instruction fetch unit (IFU) deactivates the stream that is terminated. As an example, in FIG. 14, in an embodiment, the IFU sends a signal ending or deactivating stream 0, and the mapper deallocates entries in the mapper copy that corresponds to stream 0. In an embodiment, the copy of the mapper corresponding to stream 0 is also disabled. In one or more embodiments, the mapper uses the stream ID of stream 0 to disable the mapper no longer in use as shown in FIG. 14. For example, FIG. 14 shows a portion of the processor where stream 0 is deactivated, the mapper deallocates entries from mapper copy 0 corresponding to stream 0, and disables mapper copy 0.

Figure 15:
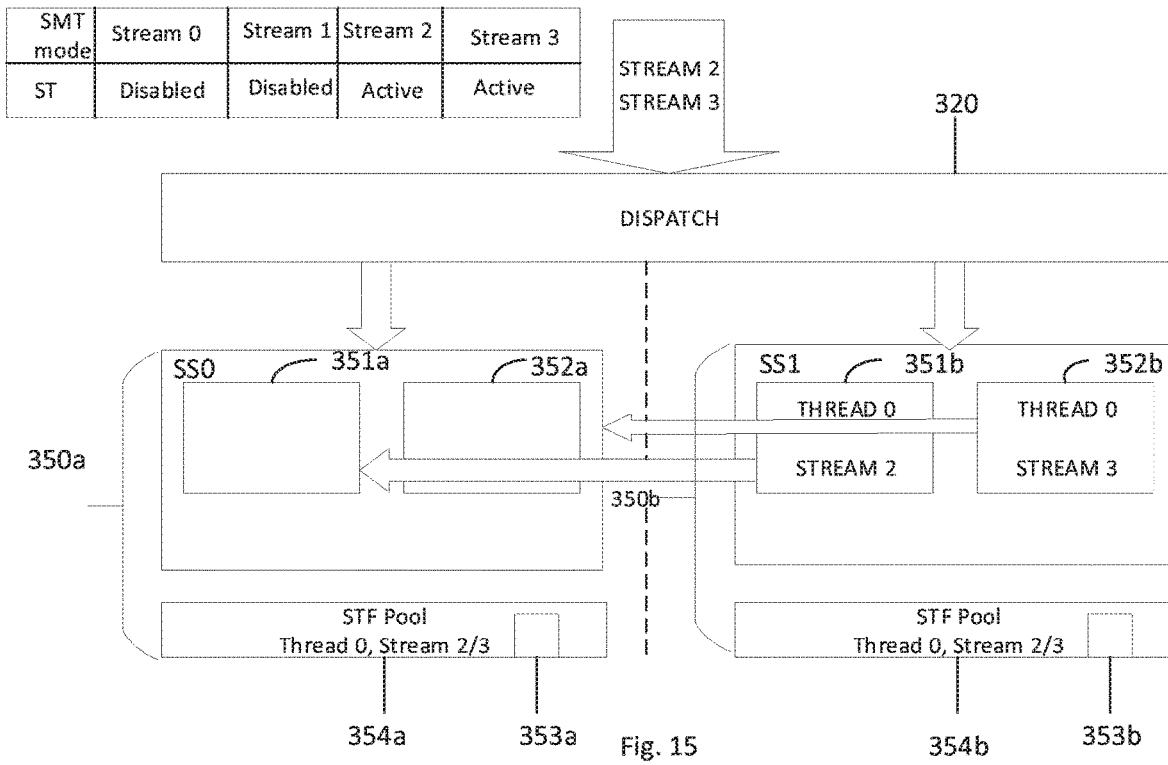
FIG. 15 illustrates a block diagram of a portion of a multi-slice processor operating in single thread mode and parallel processing two streams of the same thread of instructions after disabling the processing of two of four streams of the same thread of instructions according to an embodiment of the disclosure.

Dispatch of instructions continues on stream 1, stream 2, and stream 3 that were not disabled, and the mapper that corresponds to the stream that was terminated is ready to start another stream. When another one of the paths or streams being processed has finished or concluded, e.g., the stream is terminated if it is the wrong path, the instruction fetch unit (IFU) deactivates the stream that is terminated. As an example, in FIG. 15, in an embodiment, the IFU sends a signal ending or deactivating stream 1, and the mapper deallocates entries in the mapper copy that corresponds to stream 1. In an embodiment, the copy of the mapper corresponding to stream 1 is also disabled. In one or more embodiments, the mapper uses the stream ID of stream 1 to disable the mapper no longer in use as shown in FIG. 15. For example, FIG. 15 shows a portion of the processor where stream 0 and stream 1 are deactivated, the mapper deallocates entries from super slice 0, mapper copy 0 corresponding to stream 0 and mapper copy 1 corresponding to stream 1, and disables super slice mapper copy 0 and copy 1. In this embodiment of FIG. 15 where both copies of the mapper in super slice 0 have been deactivated, in an embodiment, to permit both remaining streams 2 and 3 to be dispatched to both super slices, the state of mapper copy 0 in super slice 1 is copied to mapper copy 0 in super slice 0; and the state of mapper copy 1 in super slice 1 is copied to mapper copy 1 in super slice 0. Dispatch of instructions continues on stream 2, and stream 3 that were not disabled.

When yet another one of the two paths or streams being processed has finished or concluded, e.g., the stream is terminated if it is the wrong path, the instruction fetch unit (IFU) deactivates the stream that is terminated. As an example, in an embodiment, the IFU sends a signal ending or deactivating stream 3, and the mapper deallocates entries in the mapper copy that corresponds to stream 3. In an embodiment, the copy of the mapper corresponding to stream 3 is also disabled. In one or more embodiments, the mapper uses the stream ID of stream 3 to disable the mapper no longer in use. The processor and mapper states will be similar to the illustration shown in FIG. 9, where the mapper copy 0 in both super slices will be used to process stream 2, instead of stream 0 as shown in FIG. 9.

Figure 16:
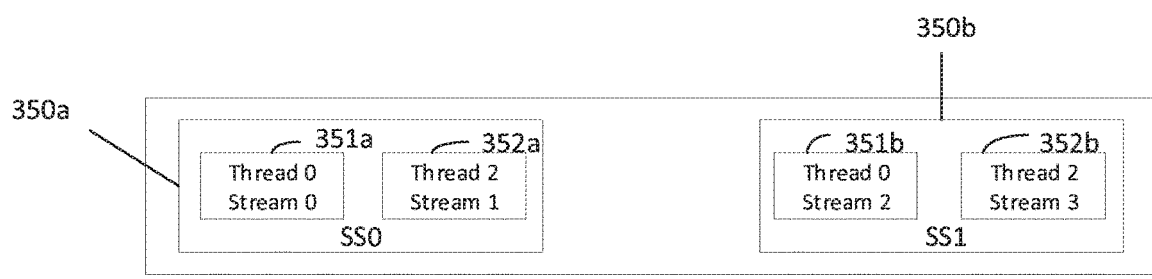
FIG. 16 illustrates a block diagram of a portion of a multi-slice processor operating in double thread mode and parallel processing four streams of the same thread of instructions according to an embodiment of the disclosure.

In the configuration of the processor as shown in FIG. 5, the processor can also process multiple streams if it is operating in two thread (SMT2) mode. In the processor configuration of FIG. 5 where the processor can execute four (4) threads simultaneously (SMT4), the processor in two-thread (SMT2) mode can process two streams per thread for a total of four streams, where each stream exists in a single mapper copy as shown in FIG. 16. As a new stream in a thread is detected, in an embodiment, the mapper is activated and contents are copied from the parent stream to the child stream in the same manner as a new stream being activated in single-thread (ST) mode.

While the method of simultaneous streaming, also referred to as parallel processing or execution of both paths of a branch instruction, has been described with reference to a processor that is configured with four execution slices and for processing up to four threads at a time, the disclosure and teaching has application to other processor configurations, and can include parallel processing of multiple streams in SMT4 mode, as well as ST mode and SMT2 mode.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, circuitry, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, the method comprising:
processing a parent stream;
detecting a branch instruction in the parent stream;
activating an additional child stream;
copying the content of a parent mapper copy of the parent stream to an additional child mapper copy;
dispatching instructions for the parent stream and the additional child stream, and
executing the parent stream and the additional child stream on different execution slices.

2. The method of claim 1, wherein a first parent mapper copy is associated and used in connection with executing the parent stream and a second different child mapper copy is associated and used in connection with executing the additional child stream.

3. The method of claim 1, further comprising processing one or more threads of execution on one or more execution slices.

4. The method according to claim 1, further comprising determining the number of threads of execution that the processor is executing.

5. The method according to claim 1, further deactivating one of the parent or child streams.

6. The method according to claim 5, further comprising deallocating mapper copy entries for the deactivated stream.

7. The method according to claim 5, further comprising deactivating the mapper copy for the deactivated stream.

8. The method of claim 5, further comprising copying the mapper state of the mapper copy handling the stream that was not deactivated to a different mapper copy.

9. The method of claim 1, wherein the processor has four execution slices that can process four threads of instructions and the processor is further configured to process up to four streams of instructions.

10. The method of claim 9, where the processor has two super slices where each super slice has two execution slices and two mapper copies and a register file free list.

11. A system for processing data, the system comprising:
at least one processor having at least one super slice;
the at least one super slice having at least two execution slices for processing instructions, and a mapper having two mapper file copies, each mapper file copy having entries for storing data;
each execution slice having at least one execution unit;
one or more computer readable non-transitory storage media; and
programming instructions stored on the one or more computer readable non-transitory storage media for execution by the at least one processor,
wherein the programming instructions when executed by the processor cause the processor to:
process a parent stream;
detect a branch instruction in the parent stream;
activate an additional child stream;
copy the contents of the parent mapper file copy of the parent stream to an additional child mapper file copy;
dispatch instructions for the parent stream and the additional child stream, and
execute the parent stream and additional child stream on different execution slices using different execution units.

12. The system according to claim 11, wherein the processor is configured to operate in a number of modes of operation including single thread mode, double thread mode (SMT2) and four-threaded mode (SMT4) and the system further comprises programming instructions that when executed by the processor cause the processor to determine the mode in which the processor is operating.

13. The system according to claim 11, further comprising programming instructions that when executed by the processor cause the processor to deactivate one of the streams.

14. The system according to claim 13, further comprising programming instructions that when executed by the processor cause the processor to deallocate mapper file copy entries for the deactivated stream.

15. The system according to claim 13, further comprising programming instructions that when executed by the processor cause the processor to deactivate the mapper copy for the deactivated stream.

16. The system of claim 13, further comprising programming instructions that when executed by the processor cause the processor to copy the mapper state of the mapper file copy handling the stream that was not deactivated to a different mapper file copy.

17. The system of claim 11, wherein the processor has four execution slices that can process four threads of instructions and the processor is further configured to process up to four streams of instructions.

18. The system of claim 11, wherein a first mapper file copy is associated and used in connection with executing the parent stream and a second different mapper file copy is associated and used in connection with executing the additional child stream.

19. A system for processing data, the system comprising:
at least one processor having at least one super slice;
the at least one super slice having at least two execution slices for processing instructions, each execution slice having at least one execution unit;
at least one physical register file per super slice;
at least one mapper per super slice for tracking associations between the physical register file and logical register files, each mapper having at least two mapper file copies, each mapper file copy having a plurality of entries for storing data, at least one mapper file copy associated with each execution slice,
wherein the system is configured to execute multiple threads of execution and multiple streams of one or more threads of execution, wherein a stream identification is used to determine which mapper copy to use while executing multiple streams of one or more threads of execution.

20. The system of claim 19, wherein the processor comprises two super slices, each super slice having two execution slices, the processor configured to process a single thread of execution, two threads of execution simultaneously, or four threads of execution simultaneously, and the processor is further configured to process up to four streams of execution, wherein the processor is configured to activate one of the mapper file copies to process an additional stream and to copy the contents of a parent mapper file copy to an additional child mapper file copy to process the additional stream using the additional child mapper file copy.

* * * * *